(12) United States Patent
Tsutsui

(10) Patent No.: US 9,104,390 B2
(45) Date of Patent: Aug. 11, 2015

(54) INFORMATION PROCESSING APPARATUS AND METHOD OF CONTROLLING INFORMATION PROCESSING APPARATUS

(75) Inventor: Tomonori Tsutsui, Ome (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 438 days.

(21) Appl. No.: 13/569,991

(22) Filed: Aug. 8, 2012

(65) Prior Publication Data

US 2013/0111198 A1    May 2, 2013

(30) Foreign Application Priority Data

Oct. 27, 2011    (JP) .................................. 2011-236192

(51) Int. Cl.
*G06F 1/24*    (2006.01)
*G06F 9/00*    (2006.01)
*G06F 1/26*    (2006.01)
*G06F 1/16*    (2006.01)

(52) U.S. Cl.
CPC ................ *G06F 1/24* (2013.01); *G06F 1/1635* (2013.01); *G06F 1/26* (2013.01); *G06F 9/00* (2013.01)

(58) Field of Classification Search
CPC .......... G06F 1/1635; G06F 1/24; G06F 1/26; G06F 9/00; G06F 9/24; G06F 9/268; G06F 9/4403
See application file for complete search history.

(56) References Cited

U.S. PATENT DOCUMENTS

| 5,963,196 | A | * | 10/1999 | Nishiumi et al. ............. 345/161 |
| 7,562,240 | B2 | | 7/2009 | Tsuji |
| 2003/0115001 | A1 | * | 6/2003 | Odaohhara ...................... 702/63 |
| 2003/0201755 | A1 | * | 10/2003 | Briggs et al. .................. 320/135 |

FOREIGN PATENT DOCUMENTS

| JP | 11-095875 | 4/1999 |
| JP | 2002-373035 | 12/2002 |
| JP | 2004-140457 | 5/2004 |
| JP | 2006-109158 | 4/2006 |
| JP | 2007-140942 | 6/2007 |

OTHER PUBLICATIONS

Japanese Office Action for Japanese Application No. 2011-236192, mailed Oct. 16, 2012 in 4 pages.
Japanese Office Action for Japanese Application No. 2011-236192, mailed Jan. 22, 2013 in 7 pages.

* cited by examiner

*Primary Examiner* — Dennis M Butler
(74) *Attorney, Agent, or Firm* — Knobbe, Martens, Olson & Bear LLP

(57) ABSTRACT

According to one embodiment, an information processing apparatus, includes a power management controller configured to perform power management of the apparatus, a power supply circuit configured to supply an operational power to components of the apparatus using power supplied from a rechargeable battery, and a power supply controller configured to control the circuit in response to a request from the power management controller. The power supply controller is coupled to two or more switches, and is configured to cause the power management controller to execute an initialization process in response to a first operation of the two or more switches.

8 Claims, 4 Drawing Sheets

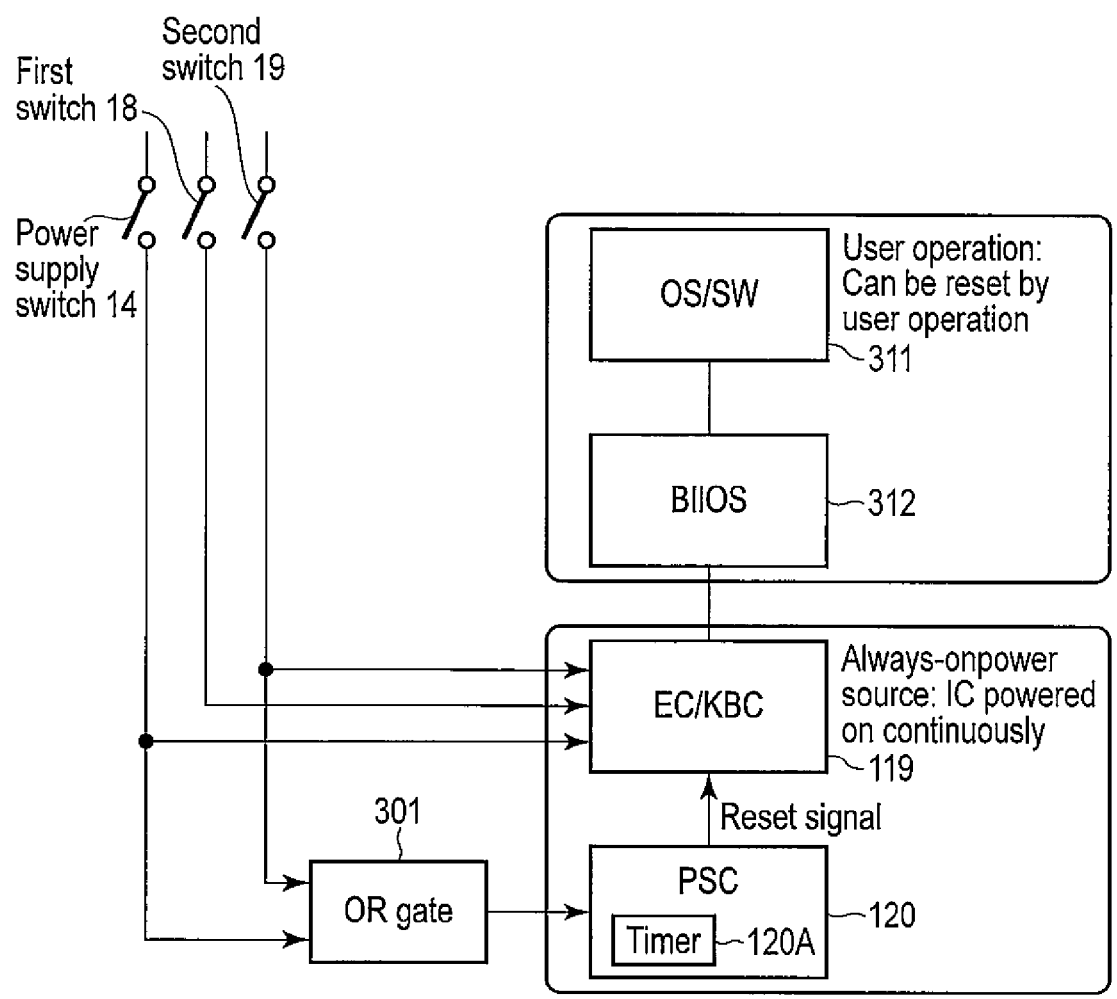
F I G. 3

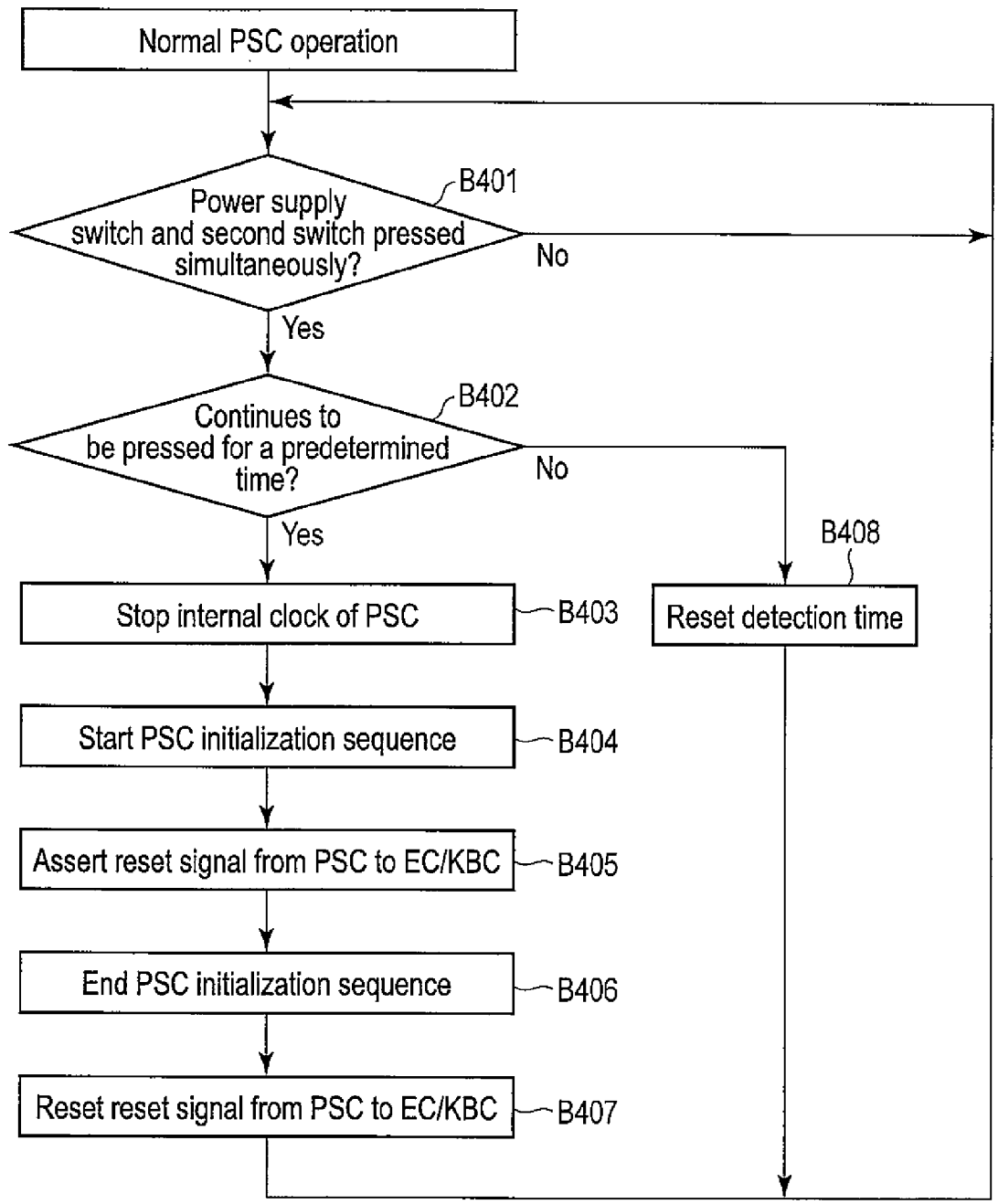
F I G. 4

INFORMATION PROCESSING APPARATUS AND METHOD OF CONTROLLING INFORMATION PROCESSING APPARATUS

CROSS-REFERENCE TO RELATED APPLICATIONS

This application is based upon and claims the benefit of priority from prior Japanese Patent Application No. 2011-236192, filed Oct. 27, 2011; the entire contents of which are incorporated herein by reference.

FIELD

Embodiments described herein relate generally to a method of controlling an information processing apparatus and a method of controlling the same.

BACKGROUND

In recent years, products integrated with batteries in the computer body are commercially available. Usually, when a battery is integrated in a computer body, the battery cannot be removed by the user.

A computer with a removable battery can be forcibly terminated by removing an AC adaptor and the battery when an unexpected malfunction occurs in the computer. A computer with a non-removable battery cannot be forcibly terminated by removing an AC adaptor and a battery.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary block diagram illustrating an exemplary configuration of forcibly terminating the information processing apparatus according to the embodiment.

FIG. 4 is an exemplary block diagram illustrating a procedure of a forced termination process performed by the information processing apparatus according to the embodiment.

DETAILED DESCRIPTION

Various embodiments will be described hereinafter with reference to the accompanying drawings.

In general, according to one embodiment, an information processing apparatus comprises a rechargeable battery, a plurality of switches, a power management controller, a power supply circuit, and a power supply controller. Each switch of the plurality of switches is configured to cause the apparatus to execute a respective process. The power management controller is configured to perform power management of the apparatus in response to an operation of a power supply switch of the plurality of switches. The power supply circuit is configured to supply operational power to components of the apparatus using power from the rechargeable battery. The power supply controller is configured to control the power supply circuit in response to a request from the power management controller. The power supply controller is coupled to two or more switches of the plurality of switches. The power supply controller is configured to cause the power management controller to execute an initialization process by controlling a reset signal to the power management controller in response to a first operation of the two or more switches.

Figure 1:
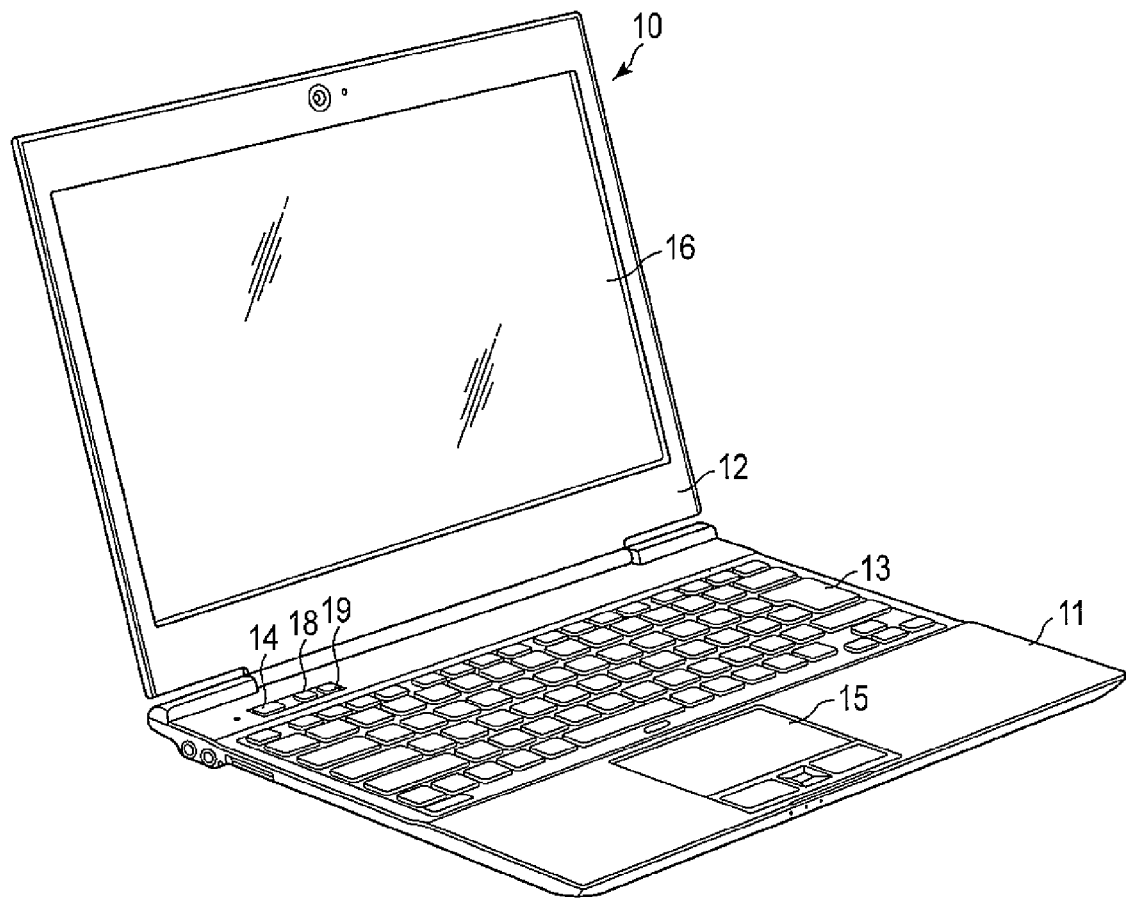
FIG. 1 is an exemplary perspective view illustrating an exemplary outer view of an information processing apparatus according to an embodiment.

A configuration of an information processing apparatus according to an embodiment will now be described with reference to FIG. 1. The information processing apparatus is embodied as a notebook personal computer 10, which can be driven by a battery (rechargeable battery), for example. FIG. 1 is a perspective view of the computer 10 viewed from the front in a state in which a display unit is open. The computer 10 comprises a computer main body 11 and a display unit 12. The display unit 12 includes an integrated display device formed of a liquid crystal display (LCD) 16.

The display unit 12 is supported by the computer main body 11, so as to be rotatable between an open position in which an upper surface of the computer main body 11 is exposed and a closed position in which the upper surface of the computer main body 11 is covered with the display unit 12, with respect to the computer main body 11. The computer main body 11 includes a flat box-shaped housing, and a keyboard 13, a power supply switch 14 configured to power on/off the computer 10, a pointing device 15, a first switch 18, and a second switch 19 are provided on an upper surface of the housing. Each of the power supply switch 14, the first switch 18, and the second switch 19 is assigned a function of causing the computer to perform a predetermined process. For example, each of the first switch 18 and the second switch 19 is assigned a function of executing an application program assigned to the switch in response to a user operation.

Figure 2:
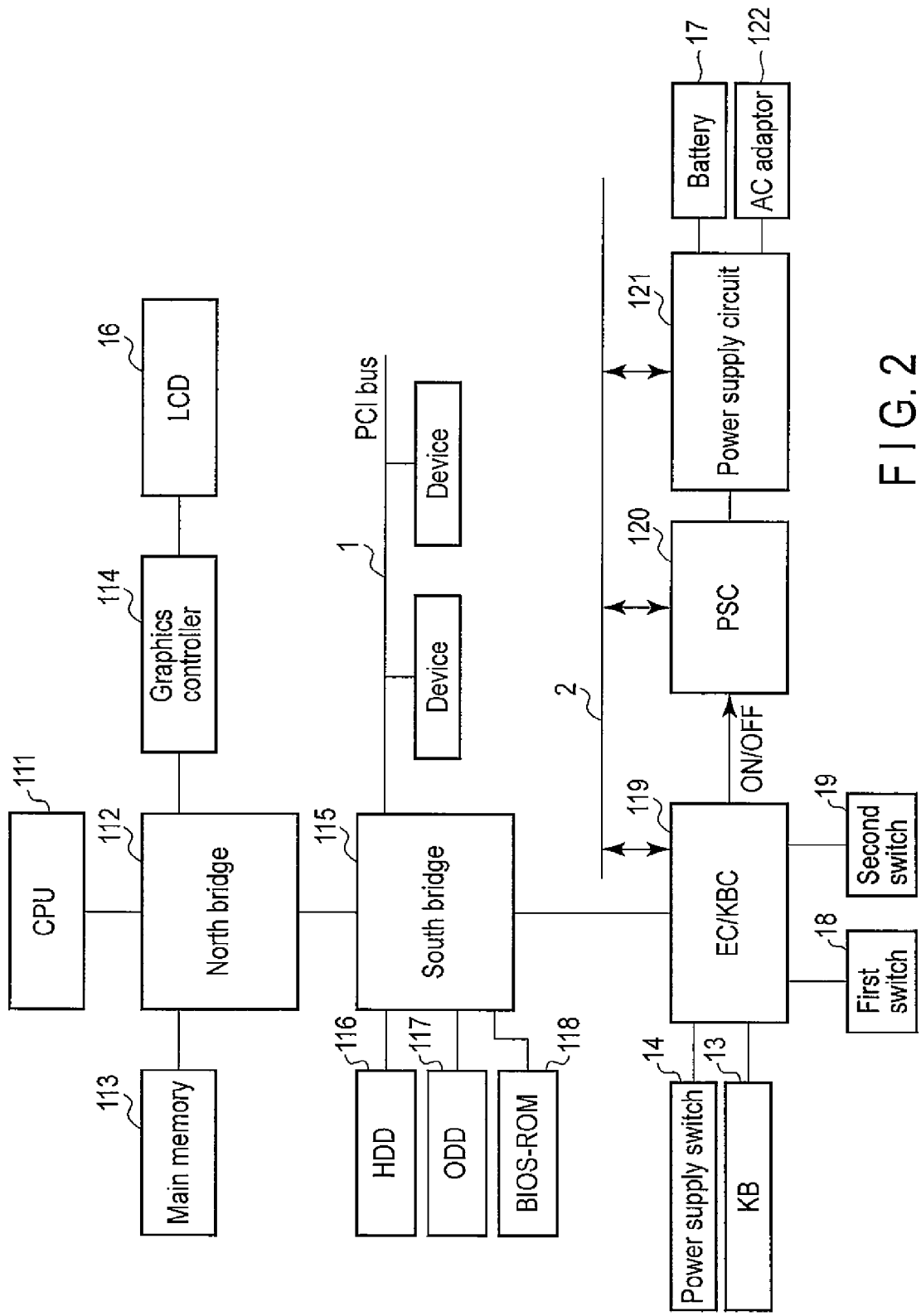
FIG. 2 is an exemplary block diagram illustrating an exemplary system configuration of the information processing apparatus according to the embodiment.

FIG. 2 illustrates a system configuration of the computer 10. The computer 10 comprises a CPU 111, a Northbridge 112, a main memory 113, a graphics controller 114, a Southbridge 115, a hard disc drive (HDD) 116, a BIOS-ROM 118, an embedded controller/keyboard controller (EC/KBC) 119, a power supply controller (PSC) 120, a power supply circuit 121, an AC adaptor 122, and the like. The AC adaptor 122 is used as an external power supply device.

The CPU 111 is a processor configured to control the operation of each component of the computer 10. The CPU 111 executes a variety of types of software loaded from the HDD 116 into the main memory 113, such as the operating system (OS) and a variety of types of application programs. The CPU 111 also executes the basic input/output system (BIOS) stored in the BIOS-ROM 118, which is a non-volatile memory. The BIOS is a system program designed to control hardware.

The Northbridge 112 is a bridge device that connects a local bus of the CPU 111 and the Southbridge 115. The Northbridge 112 also has a function of conducting communications with the graphics controller 114. Further, the Northbridge 112 includes an integrated memory controller which controls the main memory 113. The graphics controller 114 is a display controller configured to control the LCD 16, which is used as a display monitor of the computer 10.

The Southbridge 115 is connected to a PCI bus 1, and conducts communications with each device on the PCI bus 1. Further, an Integrated Drive Electronics (IDE) controller, designed to control the hard disc drive (HDD) 116, and a Serial ATA controller are integrated in the Southbridge 115.

The EC/KBC 119, the power supply controller (PSC) 120, the power supply circuit 121, and the battery 17 are mutually connected via a serial bus 2, which is an $I^2C$ bus, a Low Pin Count (LPC) bus, or the like. The embedded controller/keyboard controller (EC/KBC) 119 is a 1-chip microcomputer on which an embedded controller designed to perform power management and a keyboard controller designed to control the keyboard (KB) 26 and the pointing device 15 are mounted. The EC/KBC 119 has a function of powering on/off the computer 1 in response to a user operation.

The EC/KBC 119 has a function of powering on/off the computer 10 in response to a user operation on the power supply switch 14. The power on/off control of the computer 10 is cooperatively performed by the EC/KBC 119 and the power supply controller (PSC) 120. The power supply controller (PSC) 120 powers on or off the computer 10 by controlling the power supply circuit 121 in response to a signal transmitted from the embedded controller of the EC/KBC 119. Upon receipt of an ON signal transmitted from the embedded controller of the EC/KBC 119, the power supply controller (PSC) 120 makes a power-on signal to be transmitted to the power supply circuit 121 high and powers on the computer 10 by controlling the power supply circuit 121. Upon receipt of an off signal transmitted from the embedded controller of the EC/KBC 119, the power supply controller (PSC) 120 makes the power-on signal to be transmitted to the power supply circuit 121 low and powers off the computer 10. The EC/KBC 119, the power supply controller (PSC) 120, and the power supply circuit 121 continue to operate under power from the battery 17 or from the AC adaptor 122 even while the computer 10 is powered off.

The power supply circuit 121 generates an operational power source to each component using the power from the battery 17 attached to the computer main body 11 or the power from the AC adaptor 122 connected to the computer main body 11 as an external power source. When the AC adaptor 122 is connected to the computer main body 11, the power supply circuit 121 generates an operational power source to each component using the power from the AC adaptor 122, and charges the battery 17.

The battery 17 is integrated in the computer main body 11 and cannot be removed by the user. When an unexpected malfunction occurs in the EC/KBC 119 in the computer 10, the EC/KBC 119 can be reset by removing both of the AC adaptor 122 and the battery 17. The approach of resetting the EC/KBC 119 by removing the battery and force-quitting the computer 10, however, cannot be used in a computer with a non-removable integrated battery, since the battery cannot be removed.

In the computer 10, when an unexpected malfunction occurs in the EC/KBC 119, the EC/KBC 119 can be reset by pressing and holding the power supply switch 14 and the second switch 19 simultaneously and forcibly terminating the computer 10.

A configuration of force-quitting the computer 10 by pressing and holding the power supply switch 14 and the second switch 19 simultaneously will now be described with reference to FIG. 3.

An output signal of each of the power supply switch 14 and the second switch 19 is input to an OR gate 301. The OR gate 301 is a circuit (logic circuit) configured to detect a simultaneous operation of the power supply switch 14 and the second switch 19. The OR gate 301 outputs a detection signal generated according to operational states of the OR gate 301, the power supply switch 14, and the second switch 19 to the PSC 120. When the power supply switch 14 is operated, a low signal is input to the OR gate 301. When the power supply switch 14 is not operated, a high signal is input to the OR gate 301. When the second switch 19 is operated, a low signal is input to the OR gate 301. When the second switch 19 is not operated, a high signal is input to the OR gate 301. When both of the power supply switch 14 and the second switch 19 are operated, the OR gate 301 outputs a low signal to the PSC 120 as a detection signal. When neither of the power supply switch 14 and the second switch 19 is operated, the OR gate 301 outputs a high signal to the PSC 120 as a detection signal. The detection signal from the OR gate 301 is assigned to an interrupt port of the PSC 120, and is handled with high priority by the PSC 120.

When a low signal is output from the OR gate 301, the PSC 120 operates a timer 120A designed to determine whether the amount of time during which the switches are simultaneously pressed exceeds a predetermined amount of time. The timer 120A is set for 10 seconds, for example. The timer 120A stops counting when the detection signal goes high. When the value of the timer 120A becomes 0 after a preset amount of time has elapsed, the PSC 120 temporarily halts an internal clock of the PSC 120. The PSC 120 is reset. By resetting the PSC 120, the power-on signal to be transmitted to the PSC 120 goes low. When the power-on signal goes low, the power supply circuit 121 stops an output of the operational power source to components other than the PSC 120 and the EC/KBC 119. In order to operate again after the internal clock of the PSC 120 is resumed, the PSC 120 starts an initialization sequence by causing a program counter to return to a memory address at the time of hardware reset. After starting the initialization sequence, the PSC 120 asserts a reset signal to be transmitted to the EC/KBC 119.

When the initialization sequence of the PSC 120 ends, the PSC 120 negates the reset signal to be transmitted to the EC/KBC 119. The EC/KBC 119 executes the initialization sequence.

Under a normal operation, the EC/KBC 119 instructs the PSC 120 to power off the computer in response to an instruction from an operating system/software (OS/SW) 311 via the BIOS 312.

Next, a procedure of the forced shutdown process performed by the computer 10 by pressing and holding the power supply switch 14 and the second switch 19 will be described with reference to the flowchart of FIG. 4.

The PSC 120 determines on a regular basis whether the power supply switch 14 and the second switch 19 are simultaneously pressed, in response to a detection signal output from the OR gate 301 (block B401). When it is determined that the power supply switch 14 and the second switch 19 are simultaneously pressed (block B402), the PSC 120 operates the timer 120A designed to determine whether the amount of time during which the switches are simultaneously pressed exceeds a preset amount of time.

When the power supply switch 14 and the second switch 19 are no longer pressed simultaneously and the detection signal output from the OR gate 301 goes low (No in block B402), the timer 120A stops counting and is reset (block B408). When the value of the timer 120A becomes 0 (Yes in block B402), the PSC 120 stops the internal clock and resets the PSC 120 (block B403). By resetting the PSC 120, a power-on signal to be output to the power supply circuit 121 from the PSC 120 goes low. The power supply circuit 121 stops supplying an operational power source to components other than the PSC 120 and the EC/KBC 119.

The PSC 120 starts an initialization sequence of the PSC 120 itself (block B404). After the initialization sequence is started, the PSC 120 asserts a reset signal to be transmitted to the EC/KBC 119 (block B405). By asserting the reset signal, the EC/KBC 119 continues to be reset. After the initialization sequence of the PSC 120 ends (block B406), the PSC 120 negates the reset signal to be transmitted to the EC/KBC 119 (block B407). By negating the reset signal, the EC/KBC 119 starts an initialization sequence. When the initialization sequence of the EC/KBC 119 ends, the computer can be powered on by operating the power supply switch 14.

As described above, by pressing and holding the power supply switch 14 and the second switch 19 simultaneously, the computer can be force-quitted terminated, and the EC/KBC 119 and the PSC 120 can be reset.

As described above, only the initialization of the EC/KBC 119 may be performed by pressing and holding the power supply switch 14 and the second switch 19 simultaneously, without stopping the function of the EC/KBC 119. Thereby, the embedded controller as a power management controller of the EC/KBC 119 can be initialized. By initializing the embedded controller, forced shutdown can be performed by pressing and holding the power supply switch.

Further, by using the power supply switch 14 and the second switch 19 which are not adjacent to each other, it becomes possible to suppress start of a forced shutdown process by error pressing.

In the above-described embodiment, the forced shutdown process has been described as being performed when two switches are pressed and held simultaneously, but the forced shutdown process may be configured to be performed when two or more switches are pressed and held simultaneously. Further, the forced shutdown process may be configured to be performed when two or more switches are operated in a predetermined order. Further, the two or more switches have been described as including the power supply switch 14, but the two or more switches may be configured to include a switch other than the power supply switch. Moreover, the computer 10 has been described as comprising the keyboard 13 and the keyboard controller, but may be configured as a computer that does not include the keyboard 13 or the keyboard controller, such as a slate computer, by allowing a forced shutdown process to be performed when a predetermined operation is performed on switches.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a CPU:
a rechargeable battery;
a plurality of switches, each switch of the plurality of switches configured to cause the apparatus to execute a respective process;
a power management controller configured to perform power management of the apparatus in response to an operation of a power supply switch of the plurality of switches;
a power supply circuit configured to supply operational power to components of the apparatus using power from the rechargeable battery; and
a power supply controller configured to control the power supply circuit in response to a request from the power management controller, the power supply controller coupled to two or more switches of the plurality of switches and configured to cause the power management controller to execute an initialization process by controlling a reset signal to the power management controller in response to a first operation of the two or more switches.

2. The apparatus of claim 1, wherein the power supply controller is configured to stop supply of the operational power from the power supply circuit to components other than the power management controller and the power supply controller.

3. The apparatus of claim 2, wherein the power supply controller is configured to temporarily halt an internal clock to stop supply of the operational power from the power supply circuit to the components other than the power management controller and the power supply controller.

4. The apparatus of claim 1, wherein the two or more switches comprise a first switch and a second switch, and the first operation comprises operating the first switch and the second switch simultaneously for a first period of time.

5. The apparatus of claim 4, wherein the plurality of switches further comprise a third switch between the first switch and the second switch.

6. The apparatus of claim 1, wherein the two or more switches comprise the power supply switch.

7. The apparatus of claim 1, further comprising a keyboard and a keyboard controller configured to control the keyboard, the keyboard controller and power management controller mounted on a microcomputer, wherein
the power supply controller is configured to cause the keyboard controller to execute an initialization process by controlling the reset signal in response to the first operation on the two or more switches.

8. The apparatus of claim 1, wherein the power supply circuit supplies the operational power to the power supply controller when the power supply circuit stops supplying the operational power to the CPU.

* * * * *